P. J. McINTYRE.
AUTOMOBILE PROTECTOR.
APPLICATION FILED AUG 31, 1917.

1,285,290.

Patented Nov. 19, 1918.

Inventor:
Patrick J. McIntyre
By Horatio E. Bellows
Attorney.

UNITED STATES PATENT OFFICE.

PATRICK J. McINTYRE, OF CRANSTON, RHODE ISLAND.

AUTOMOBILE-PROTECTOR.

1,285,290.

Specification of Letters Patent.   Patented Nov. 19, 1918.

Application filed August 31, 1917.   Serial No. 189,091.

*To all whom it may concern:*

Be it known that I, PATRICK J. MCINTYRE, a citizen of the United States, residing at Cranston, in the county of Providence and State of Rhode Island, have invented certain new and useful Improvements in Automobile-Protectors, of which the following is a specification.

My invention relates to a device for preventing the theft of an automobile or like vehicle, and is applicable to a rotary part thereof, such as to a wheel.

The essential objects of my invention are to check the speed of the automobile without preventing a limited rotation of the wheels; to visually attract notice to an unauthorized driving away of the vehicle; to insure the device against unauthorized disengagement of the parts of the device from each other, or of the device itself from the wheel. Other objects will be evident from the following description.

To the above ends primarily my invention consists in such parts and in such combinations of parts as fall within the scope of the appended claims.

In the accompanying drawings which form a part of this specification—

Figures 1, 2:
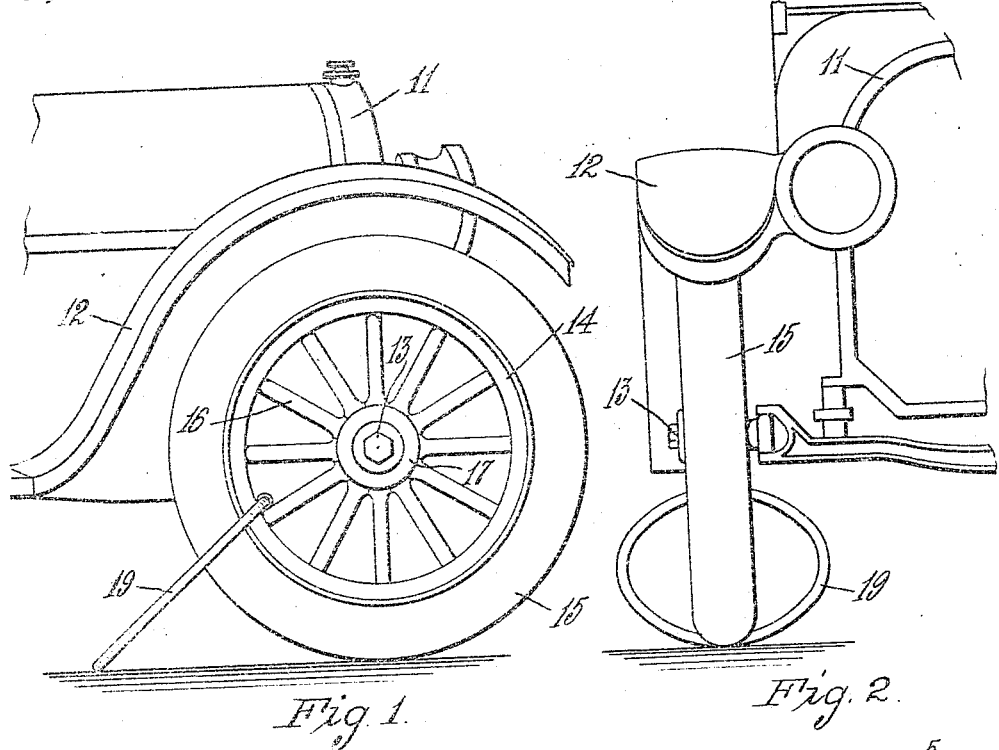
Figures 3, 4:
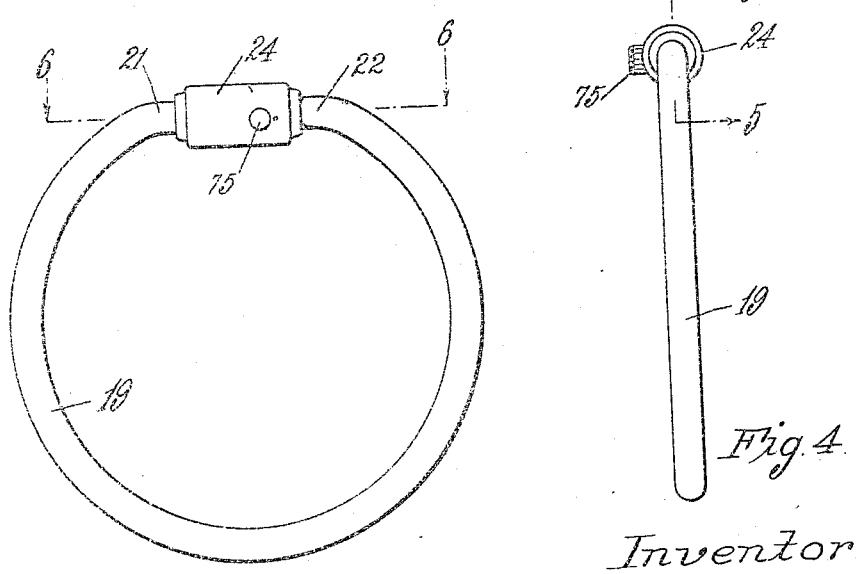

Figures 1 and 2 are side and front elevations respectively of an automobile wheel engaged by my novel device, and Figs. 3 and 4, front and side elevations respectively of said device.

Like reference characters indicate like parts throughout the views.

My novel device is herein shown, as applied to an automobile comprising the usual radiator or body 11, mud guard 12, axle 13, wheel rim 14, tire 15, spokes 16 and hub 17, and comprises a split annulus or ring 19 of hardened steel or other similar resilient material whose straight inturned ends 21 and 22 are detachably engaged in some convenient member, whereby one end of the ring may be distended and the ring be opened to allow passage therethrough of the wheel rim 14 and tire 15 and may then be closed and locked. The lock in this instance is a barrel 24. When locked the ring, which is of ample diameter, loosely rests upon the rim or upon one of the spokes 16 and extends radially not only a considerable distance behind or in front of the wheel, with a portion touching the ground, as shown in Fig. 1, but also, as shown in Fig. 2, extends laterally from both sides of the wheel. When the latter rotates there is room between the guard 12 and the tire 15 to permit the passage therebetween of the ring; but a speedy rotation of the wheel would make noisy contact with the same, and in any instance, the conspicuous appearance of the ring would attract the eye of the passer by. In either instance the intended theft would be exposed. This device permits the automobile to be moved by the police any short distance slowly to properly locate the machine, and without jouncing the machine. This would not be the case if the ring were of small diameter and clamped to the wheel or were a chock.

I claim:—

1. In combination with the hub, spokes, and rim of a vehicle wheel, a split ring loosely surrounding the rim and adapted to contact with the adjacent spokes when the wheel rotates, and means for locking the ends of the ring.

2. In combination with the hub, spokes, rim and tires of a vehicle wheel, of a split ring of greater diameter than the thickness of the rim and tire loosely traversing the wheel between the rim and adjacent spokes, and a barrel fast to one end of the ring and detachably connected to the other end of the ring.

3. In combination with the hub, spokes and rim of a vehicle wheel, of a resilient split ring loosely surrounding the rim, a barrel fast to one end of the ring adapted to slidably receive the other end of the ring, and means in the barrel for locking the second end of the ring.

In testimony whereof I have affixed my signature.

PATRICK J. McINTYRE.